Feb. 24, 1942. W. D. OSBORN 2,273,984
SAFETY PLUG AND BYPASS
Filed Feb. 19, 1940
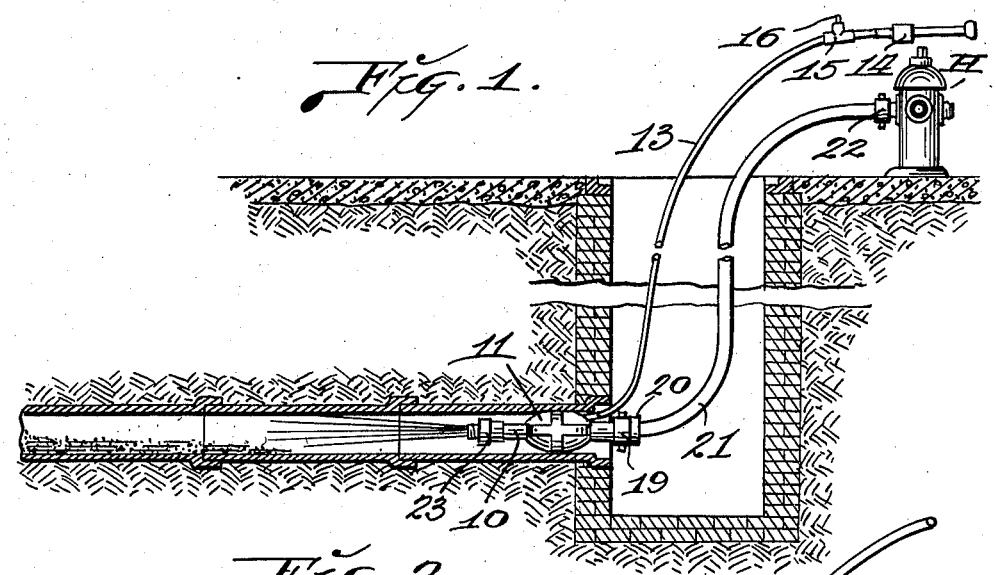
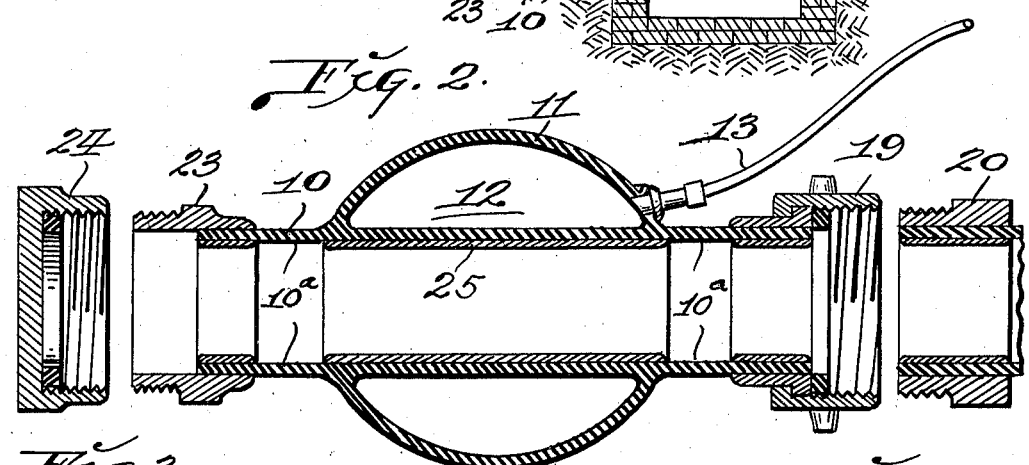
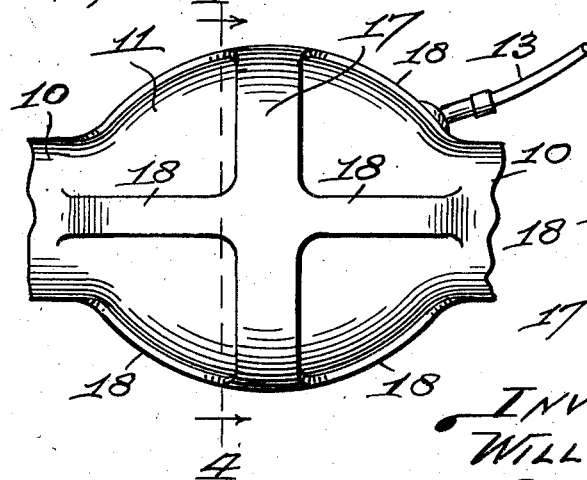
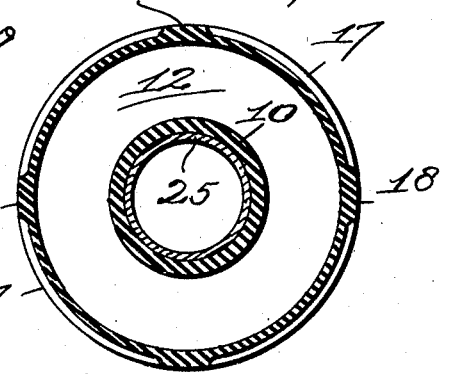
INVENTOR:—
WILLIAM D. OSBORN.
By Martin P. Smith ATTY.

Patented Feb. 24, 1942

2,273,984

UNITED STATES PATENT OFFICE 2,273,984

SAFETY PLUG AND BYPASS

William D. Osborn, Los Angeles, Calif.

Application February 19, 1940, Serial No. 319,654

1 Claim. (Cl. 138—90)

My invention relates to a safety plug and bypass particularly adapted for use in sewers, waste water lines, sewer connections, and the like, while the same are being cleaned and/or while obstructions or sediment are being removed in order that the sewers, lines, and conduits, may function to their normal capacities.

The principal objects of my invention are, to provide a safety plug and by-pass of the character referred to which after being inserted in a sewer, waste water line, or other conduit, may be expanded by means of air under pressure so as to provide a fluid pressure tight joint between the plug and the inner surface of the conduit in which it is positioned, further, to provide the plug with a tube that extends entirely through said plug and the ends of the tube being provided with standard fittings in order that it may be connected to a source of water under pressure, for instance, a conventional fire protection hydrant and further, to provide a plug and by-pass that is relatively simple, strong and durable in construction and capable of being readily positioned within a conduit for use and likewise capable of being readily removed from the conduit after the inflated portion of the plug has been partially deflated.

A further object of my invention is, to provide an improved safety plug and by-pass that includes a non-collapsible tube surrounded by an inflatable flexible member and the wall of which latter is provided on its external face with reinforcing bands disposed both longitudinally and circumferentially of said inflatable body.

With the foregoing and other objects in view, my invention consists in certain novel features of construction and arrangement of parts that will be hereinafter more fully described and claimed and illustrated in the accompanying drawing in which:

Fig. 1 is a vertical section taken through the center of a manhole with a sewer connection and showing my improved plug positioned in said sewer connection and said plug being connected to a conventional fire hydrant.

Fig. 2 is a longitudinal section taken through the center of the combined plug and by-pass contemplated by my invention.

Fig. 3 is an elevational view of the inflatable member forming a part of the plug.

Fig. 4 is a cross section taken on the line 4—4 of Fig. 3.

Referring by numerals to the accompanying drawing which illustrates a preferred embodiment of my invention, 10 designates a tube preferably formed of rubber or rubber and fabric and formed integral with the central portion of said tube on the exterior thereof is a wall 11 substantially ellipsoidal in shape and composed of flexible material, such as rubber or rubber reinforced with fabric. Thus a chamber 12 is provided around the central portion of the tube 10 and which chamber is adapted to be filled with air under pressure in order to inflate and expand the wall 11.

One end of a small flexible tube 13, preferably of rubber, is connected to one end of the wall 11 so as to deliver air under pressure into chamber 12 and carried by the other end of this tube is a conventional air pump 14 of the type used for inflating pneumatic tubes and the like. Located in tube 13 adjacent the pump 14 is a fitting 15 provided with an inwardly opening check valve, the stem 16 of which extends outwardly from the fitting so that said check valve may be readily manipulated to permit the release of air from chamber 12 through tube 13 when it is desired to deflate the plug.

Formed integral with the central portion of the wall 11 on the external face thereof is a reinforcing rib or band 17, preferably of rubber, and disposed between this reinforcing band and the ends of the wall 11 are longitudinally disposed bands or reinforcing ribs 18 of rubber (see Fig. 3).

These bands or ribs 17 and 18 afford reinforcement for the flexible wall 11 and the circumferential band 17 insures the provision of a fluid pressure tight joint between the plug and the inner surface of the tube or conduit in which the plug is positioned.

Secured in any suitable manner to one end of tube 10 is one part of a conventional hose coupling that includes an internally threaded rotating collar 19 that is adapted to receive the externally threaded end portion of a companion coupling member 20 and which latter is secured on the end of a flexible tube 21, such as an ordinary fire hose. Carried by the other end of the hose 21 is a conventional coupling member 22 by means of which the hose may be readily connected to a fire hydrant H.

Mounted on the opposite end of tube 10 is a coupling member 23 having an external thread that is adapted to be seated in a companion coupling member having an internal thread or, when it is desired to cut off passage of fluid through the plug a conventional screw cap 24 may be mounted on the threaded end of member 23.

A tube 25 of thin metal is snugly arranged within the tube 10 for the purpose of preventing the collapse of said tube when air pressure is pumped into the chamber 12 to inflate member 11.

The ends of this tube 25 are spaced apart from the coupling members 19 and 23 that are secured on the ends of tube 10 in order to provide short tubular sections 10a between said coupling members and the inflatable central portion of the device and which short tubular portions provide a certain degree of flexibility between the inflatable central portion and the ends of the device and consequently minimize tendency of cracking of the end portions of the tube as a result of bending strains developed while the plug is in service.

In the use of my improved plug and by-pass, the plug with the central portion deflated is inserted in the sewer or duct that is to be cleaned and by manipulation of the pump 14 air under pressure is delivered into chamber 12, thereby applying internal pressure to wall 11 and forcing the portion of greatest diameter thereof into intimate contact with the inner surface of the sewer pipe or conduit.

Water under pressure, for instance, from a fire hydrant is now permitted to flow through hose 21 and this water will flow through tube 10 which is maintained in full open position by the tube 25 and such water will discharge with force into the sewer or conduit to remove and wash all sediment and accumulations therefrom.

If desired, a length of hose similar to 21 may be attached to coupling member 23 and extended a substantial distance through the sewer or duct away from the plug in order to facilitate the cleaning and flushing operations.

To relieve the pressure in chamber 12 so as to permit the plug to collapse and be removed from the sewer or duct, it is only necessary to manipulate relief valve stem 16 to permit the escape of compressed air from the chamber 12.

Thus it will be seen that I have provided a safety plug and by-pass particularly intended for use in sewer cleaning and flushing operations and which plug is relatively simple in construction, inexpensive of manufacture and very effective in performing the functions for which it is intended.

The plug manufactured in smaller sizes is particularly applicable for use in the cleaning and flushing of drain pipes that lead from sinks, wash basins, and lavatories, to sewers or other waste conduits.

It will be understood that minor changes in the size, form and construction of the various parts of my improved safety plug and by-pass, may be made and substituted for those herein shown and described, without departing from the sprit of my invention, the scope of which is set forth in the appended claim.

I claim as my invention:

In a safety plug and by-pass, a flexible tube, a collapsible wall surrounding the central portion of said tube and connected thereto so as to provide a chamber, a rigid tube arranged within that portion of the flexible tube that is surrounded by said collapsible wall, means connected to and extending through said wall for delivering fluid under pressure into the chamber between said tube and wall, and coupling members mounted on the ends of said flexible tube beyond the ends of said rigid tube.

WILLIAM D. OSBORN.